Sept. 7, 1948.     M. O. TEETOR     2,448,692
MAGNETIC BLOCK
Filed Dec. 29, 1945
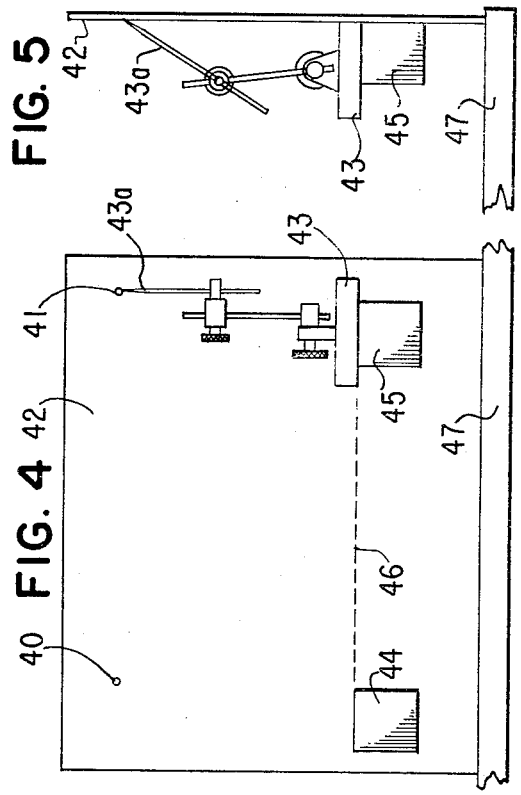
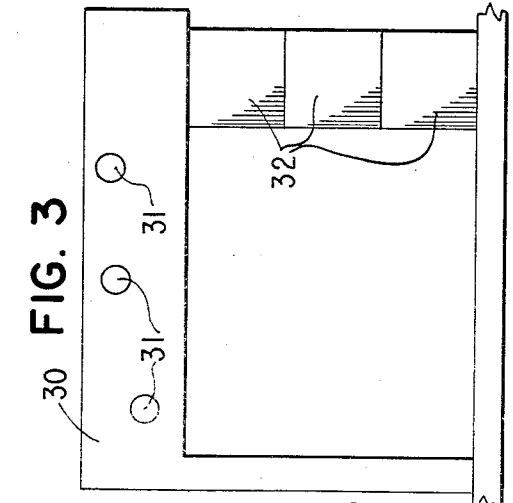
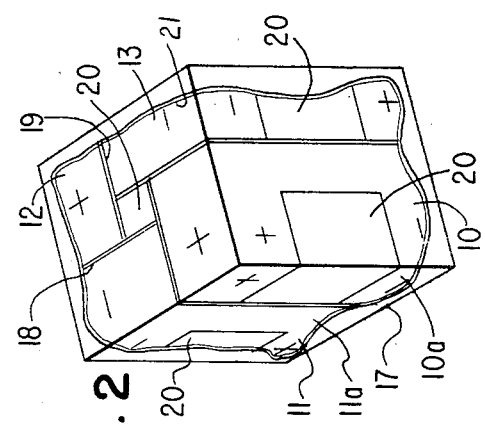
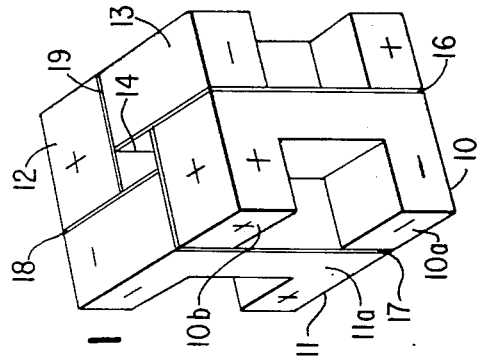
INVENTOR.
Macy O. Teetor
BY
Davis, Lindsey, Smith & Shouts
Attorneys Patented Sept. 7, 1948

2,448,692

UNITED STATES PATENT OFFICE 2,448,692

MAGNETIC BLOCK

Macy O. Teetor, New Castle, Ind.

Application December 29, 1945, Serial No. 638,103

7 Claims. (Cl. 175—367)

This invention relates to a magnetic block comprised of a plurality of permanent magnets and adapted for use as a temporary supporting member in a machine shop, plant or the like to facilitate the proper positioning of parts of machines or other equipment during assembly or disassembly, or to assist in the making of accurate measurements or for other general uses.

The magnetic block comprising the present invention serves as a specific supporting means for the performance of many functions in a machine shop, plant or the like for which no suitable device or means has heretofore been provided. It has long been common practice in a machine shop or plant, when machinery or other equipment was being assembled or disassembled, to support by means of makeshift objects such as wooden blocks, bricks or metal bars, the disassembled or loosely connected parts thereof until they were ready for removal or securely bolted in position. If such makeshift objects were not readily available it was necessary that another worker be called upon to hold the parts which were often heavy and difficult to hold steadily in proper position. The use of makeshift objects for such purposes was unsatisfactory because it was difficult, if not impossible, to find a single object of correct size and dimensions to serve as a supporting member and it was, therefore, necessary to build up several individual objects one upon the other to the proper height. However, these disconnected objects tended to shift relatively to each other under pressure since no means was provided for retaining them in their relative superimposed positions.

Likewise, makeshift objects of varying sizes have also been placed one upon the other to provide a supporting surface for measuring devices, for instance, when it was desired to measure off for drilling or cutting certain points on a plate that was fixed in vertical position relative to a horizontal base. If the points of drilling or cutting were beyond the range of a surface gauge, for instance, it was necessary to raise the gauge from the horizontal surface by supporting blocks. Yet, since the blocks were of unknown and varying heights, it was necessary that their total height be measured in order to insure that the measurement taken from the horizontal base would be accurate. Also, these gauge supporting objects were relatively unsteady and thus caused inaccurate measurements or even collapsed entirely.

It is, therefore, an object of the present invention to provide a magnetic block of known regular size adapted for use as a handy supporting member which may be built up with other like blocks capable of retaining themselves in built-up, supporting relationship by magnetic attraction.

Another object of the invention is to provide a magnetic supporting block having a high degree of magnetism on all faces and comprising a plurality of permanent magnets so arranged as to present a plurality of north magnetic poles and a plurality of south magnetic poles on each face of the block.

Still another object of the invention is to provide a magnetic supporting block possessing a very high degree of magnetism which is capable of retaining itself as a supporting member on a vertical magnetic metal surface or on other like blocks in built-up relationship.

Other and further objects and advantages of the invention will become apparent as this description progresses, reference being had to the accompanying drawing, in which:

Figure 1 is a perspective view illustrating a plurality of U-shaped permanent magnets in their relative assembled positions in the block comprising the present invention Fig. 2 is a perspective view similar to Fig. 1 but illustrating the cavities between the legs of the magnets and at the center of the block filled in with plastic or other suitable material and showing the thin outer cover broken away;

Fig. 3 is a front elevational view illustrating one adaptation of the magnetic supporting block comprising the present invention and showing a plurality of blocks stacked one upon the other and supporting one end of a machine casting in elevated position during assembly thereof to a machine;

Fig. 4 is a front elevational view illustrating another adaptation of the present invention and showing two of the magnetic blocks retained by their high magnetic properties in elevated gauge supporting position on a vertical plate of magnetic metal; and Fig. 5 is a side elevational view of the adaptation shown in Fig. 4.

The preferred embodiment of the magnetic block comprising the present invention is illustrated in Figs. 1 and 2 as comprising four permanent U-shaped magnets 10, 11, 12 and 13 which are of the same size and dimensions so that when they are grouped and assembled relative to each other as shown, a square block or cube is defined with six flat faces. The block may be made in stepped sizes such as one-half inch, one inch, one and one-half inches, two inches or even larger according to its intended use, and its size will be known to the user for proper calculation. The magnets are so arranged that their respective legs are directed outwardly in the same horizontal planes at the top and bottom of the block and on the vertical sides thereof. Thus, each of the four magnets has the north and south pole faces on the outer ends of its legs disposed in a separate vertical plane, in which is also disposed the outer vertical side face of an adjacent magnet, so that each of the vertical side faces of the block is comprised of the pole faces on the ends of the legs of one magnet and the outer vertical side face of another adjacent magnet. Thus, as shown in Fig. 1, the main north and south pole faces 10a and 10b on the ends of the legs of the magnet 10 are in the same vertical plane as the outer vertical side face of the magnet 11. The top and bottom surfaces of the block, as shown in Fig. 1, are formed by the outer side pole surfaces of the legs of the respective U-shaped magnets, which surfaces are flush with each other.

When so assembled, the inner vertical side face of one magnet is in abutting relation to the inner vertical rear face of an adjacent magnet, and because the legs of each of the magnets are of greater length than their thickness, an elongated vertical space or cavity 14 is formed at the central portion of the block by which like poles of the magnets are spaced apart. In order to secure the magnets 10, 11, 12 and 13 in the above-described assembled relationship, they may be soldered together at their abutting inner vertical faces or they may be soldered to copper strips 16, 17, 18 and 19 interposed between the inner vertical faces. When so secured, the magnets 10, 11, 12 and 13 support each other as a unit in the form of a magnetic block.

The pole ends of the magnets 10 and 12 are reversed with respect to the pole ends of the magnets 11 and 13 so that their unlike poles may be in attracting relationship. Consequently, the side faces of unlike or attracting poles of the respective magnets are adjacent to each other and there are exposed in flush relationship two pairs of opposite pole faces on each of the six sides of the block so as to provide each side with a high degree of magnetic attraction. Thus, on each face of the block there are two north poles and two south poles, the north poles being in adjacent and attracting relationship with the south poles.

After the four magnets have been secured together as a unit as above described, the vertical central cavity 14 and the rectangular cavities between the legs of the magnets at each of the corners of the block may be filled or plugged with molded plastic or other suitable material so that the outer surfaces of the plugs 20 are flush with the outer surfaces of the magnets, thereby forming six surfaces of the block that are flat and smooth from side to side. Although the block in the assembled form shown in Fig. 1 without the plastic plugs 20 in the cavities formed by the legs of the magnets and between them in the central portion of the block, may satisfactorily perform the main objects of the present invention, the provision of the plastic plugs 20 prevents the cavities from filling up with dirt, grease or other foreign material and at the same time provides smooth, flat bearing surfaces from end to end which are adapted to cooperate with flat bearing surfaces of other like blocks. Such smooth, flat surfaces also tend to prevent the adherence of foreign matter to the block. In addition, if desired, each of the outer surfaces of the block may be covered with a thin sheet 21 of plastic material, as shown in Figs. 2 and 3 to 5, inclusive, which may afford an attractive smooth surface coating and at the same time seal in the metal magnets and protect them from damage. However, the plastic sheets on each of the six surfaces of the block are relatively thin so that magnetic forces of the magnets 10, 11, 12 and 13 are not substantially impaired or reduced in their capacity to attract magnetic metal or other like magnetic blocks.

A magnetic block formed and assembled in the above-described manner with four pole faces on each of its six sides possesses a very high degree of magnetic attraction so that it is capable of being stacked upon other like magnetic blocks, which blocks will retain themselves in stacked relationship against relative displacement by magnetic attraction. Since the blocks may be of a known uniform size, a predetermined number may be selected when it is desired to build them up to any known height in the form of a supporting column. Thus, as shown in somewhat diagrammatic form in Fig. 3, when it is necessary that a casting 30 be supported at one of its ends so as to bring a plurality of bolt holes 31 into alignment with bolt holes (not shown) of a piece of machinery or equipment (also not shown), a plurality of blocks 32 may be built up one upon the other with their unlike poles in alignment to form a supporting column for one end of the casting. The casting 30 is maintained in proper aligned position and fastening bolts may be inserted therethrough and tightened, without the occurrence of any relative movement or displacement between the stacked blocks 32 which mutually retain each other against such movement by their high degree of magnetic attraction.

Another one of the many ways in which magnetic blocks comprising the present invention may be used is illustrated in Figs. 4 and 5 of the drawing. If it is desired to measure off and definitely locate the proper points 40 and 41 at the upper portion of a plate 42 fixed in vertical position on a horizontal bed 47 and it is found that the points 40 and 41 will be above the operable vertical range of a surface gauge marker 43, the magnetic blocks 44 and 45 may be placed against the plate 42 with their upper surfaces in flush relation with a horizontal line 46 drawn on the plate 42 a known distance above a horizontal bed 47. Because of their high degree of magnetic attraction, the magnets 44 and 45 are capable of retaining not only themselves in elevated position on the vertical face of the magnetic metal plate 42 but also of supporting on their upper surfaces the marking gauge 43. Thus, as shown in Figs. 4 and 5, the scriber 43a is placed within a higher vertical range with respect to the plate 42 and may mark the points 40 and 41 at which holes may be drilled on the same horizontal line equidistant above the machine bed 47.

Although there has been shown in the drawing and described above one preferred embodiment of my invention, it will be apparent that variations and modifications may be made without departing from the underlying principles of the invention. It is intended, therefore, by the following claims to include within the scope of the invention all variations and modifications by which the results of the invention may be obtained through the use of substantially the same or equivalent means.

I claim:

1. A magnetic block comprising a plurality of permanent U magnets having their respective legs directed outwardly and their respective inner and side surfaces adjacent to but spaced from each other and having a plurality of north poles in spaced relationship and a plurality of south poles in spaced relationship exposed on each side of said block and arranged with said north poles in attracting juxtaposition with said south poles, and spacer means composed of non-magnetic material between said respective inner and side surfaces of said magnets.

2. A magnetic block comprising four permanent U magnets having their respective legs directed outwardly and their respective inner and side surfaces adjacent to but spaced from each other and having a plurality of north poles in spaced relationship and a pair of south poles in spaced relationship exposed on each side of said block and arranged with said north poles in attracting juxtaposition with said south poles, and spacer means composed of non-magnetic material between said respective inner and side surfaces of said magnets.

3. A magnetic block comprising a plurality of permanent U magnets having their respective legs extending outwardly in the same horizontal planes at the top and bottom of said block and their respective inner and side surfaces adjacent to but spaced from each other and presenting a plurality of pole faces at each of their respective pole ends on a plurality of sides of said block, the like pole ends of the respective magnets being spaced apart and in attracting juxtaposition with the unlike pole ends thereof, and spacer means composed of non-magnetic material between said respective inner and side surfaces of said magnets.

4. A magnetic block comprising four permanent magnets having their inner surfaces adjacent to but spaced from each other and their respective legs extending outwardly and being so arranged that the faces on the ends of the legs of one magnet are flush with the outer vertical side surface of an adjacent magnet and its outer vertical side surface is flush with the faces on the ends of the legs of another adjacent magnet and that the upper and lower horizontal surfaces of the respective ends of said magnets are flush with each other, two of said magnets having their pole ends reversed with respect to said other two magnets so that unlike pole ends of said magnets are in adjacent and attracting relationship on every face of said block, and spacer means composed of non-magnetic material between said inner surfaces of said magnets.

5. A magnetic block comprising four permanent U magnets having their respective legs of greater length than their width and extending outwardly in the same horizontal planes at the top and bottom of said block, said magnets being arranged with the inner vertical side surface of one magnet adjacent to but spaced from the inner vertical rear surface of another magnet so that a central vertically extending cavity is formed to space apart like pole ends of said magnet, and the faces on the ends of the legs of one magnet being flush with the outer vertical side surface of an adjacent magnet and the outer vertical side surface of said one magnet being flush with the faces on the ends of the legs of another adjacent magnet and the upper and lower horizontal surfaces of the respective ends of the magnet being flush with each other, two of said magnets having their pole ends reversed with respect to said other two magnets so that unlike pole ends of said respective magnets are in attracting juxtaposition on every face of said block, and spacer means composed of non-magnetic material between said inner vertical side and rear surfaces of said magnets.

6. A magnetic block comprising four permanent U magnets having their respective legs of greater length than their width and extending outwardly in the same horizontal planes at the top and bottom of said block, said magnets being arranged with the inner vertical side surface of one magnet adjacent to but spaced from the inner vertical rear surface of another magnet so that a central vertically extending cavity is formed to space apart like pole ends of said magnet, and the faces on the ends of the legs of one magnet being flush with the outer vertical side surface of an adjacent magnet and the outer vertical side surface of said one magnet being flush with the faces on the ends of the legs of another adjacent magnet and the upper and lower horizontal surfaces of the respective ends of the magnets being flush with each other, two of said magnets having their pole ends reversed with respect to said other two magnets so that unlike pole ends of said respective magnets are in attracting juxtaposition on every face of said block, spacer means composed of non-magnetic material between said inner vertical side and rear surfaces of said respective magnets, and a plurality of non-magnetic plugs filling the central vertical cavity and the cavities between the legs of the magnets and having their outer surfaces flush with the outer surfaces of the respective magnets.

7. A magnetic block comprising four permanent magnets having their inner surfaces adjacent to but spaced from each other and having their respective legs extending outwardly in the same horizontal planes at the top and bottom of said block and each of said magnets being so arranged that the faces on the ends of the legs of one magnet are flush with the outer vertical side surface of an adjacent magnet and its outer vertical side surface is flush with the faces on the ends of the legs of another adjacent magnet and that the upper and lower horizontal surfaces of the respective ends of said magnets are flush with each other, two of said magnets having their pole ends reversed with respect to said other two magnets so that unlike pole ends of said magnets are in adjacent and attracting relationship on every face of said block, spacer means composed of non-magnetic material between said inner surfaces of said magnets, and a thin sheet of non-magnetic material enclosing the magnets on each of the sides of the block.

MACY O. TEETOR.